US008514945B2

(12) United States Patent
Nagafuji

(10) Patent No.: US 8,514,945 B2
(45) Date of Patent: Aug. 20, 2013

(54) IP STREAM TRAMSMITTING/RECEIVING SYSTEM, IP STREAM RECEIVING DEVICE AND RECEIVING PROCESS TIMING SYNCHRONIZATION METHOD USED FOR THE SAME

(75) Inventor: Nobuyuki Nagafuji, Tokyo (JP)

(73) Assignee: NEC Corporation, Tokyo (JP)

( * ) Notice: Subject to any disclaimer, the term of this patent is extended or adjusted under 35 U.S.C. 154(b) by 1695 days.

(21) Appl. No.: 11/882,178

(22) Filed: Jul. 31, 2007

(65) Prior Publication Data

US 2008/0049846 A1 Feb. 28, 2008

(30) Foreign Application Priority Data

Aug. 23, 2006 (JP) ................................ 2006-225970

(51) Int. Cl.
*H04B 1/66* (2006.01)
*H04L 12/28* (2006.01)

(52) U.S. Cl.
USPC ................................ 375/240.25; 370/395.52

(58) Field of Classification Search
USPC ............... 375/240.01–240.26; 348/465, 473, 348/461, 463, 584, 397, 409, 410, 415, 420, 348/422, 426, 427, 438; 370/509, 390, 538, 370/486, 570, 487, 471, 473, 389, 395.52, 370/395
See application file for complete search history.

(56) References Cited

U.S. PATENT DOCUMENTS

| | | | | |
|---|---|---|---|---|
| 4,759,014 | A * | 7/1988 | Decker et al. | 370/503 |
| 8,199,781 | B2 * | 6/2012 | Seo et al. | 370/535 |
| 2005/0169269 | A1 * | 8/2005 | Tomita | 370/389 |
| 2005/0243625 | A1 * | 11/2005 | Miyazawa et al. | 365/222 |
| 2006/0029065 | A1 * | 2/2006 | Fellman | 370/389 |
| 2007/0074267 | A1 * | 3/2007 | Clerget et al. | 725/136 |
| 2007/0076764 | A1 * | 4/2007 | Kawada et al. | 370/503 |
| 2007/0136777 | A1 * | 6/2007 | Hasek et al. | 725/114 |
| 2007/0247936 | A1 * | 10/2007 | Direnzo et al. | 365/200 |
| 2008/0049846 | A1 * | 2/2008 | Nagafuji | 375/240.28 |
| 2011/0128973 | A1 * | 6/2011 | Yonge et al. | 370/469 |

FOREIGN PATENT DOCUMENTS

| | | |
|---|---|---|
| JP | 2005-210219 | 8/2005 |

* cited by examiner

*Primary Examiner* — Behrooz Senfi
(74) *Attorney, Agent, or Firm* — Young & Thompson

(57) ABSTRACT

An IP (Internet Protocol) stream transmitting/receiving system according to an exemplary aspect of the present invention is an IP stream transmitting/receiving system including an IP stream receiving device for performing, at a receiving processing timing of an IP stream, at least FEC (Forward Error Correction) decoding of a received IP stream, wherein the IP stream receiving device includes a circuit for generating the receiving processing timing based on TS (Transport Stream) synchronization that is established in TS time stamp reproducing processing at the latter stage of the FEC decoding processing.

21 Claims, 13 Drawing Sheets

VIDEO / AUDIO TRANSMITTING DEVICE 1
VIDEO / AUDIO INPUT
VIDEO FRAME SYNCHRONIZATION
11
VIDEO / AUDIO CODING CIRCUIT (MPEG2)
MPEG2 -TS
TS SYNCHRONIZATION
12
TS TIME STAMP ADDING CIRCUIT
BLOCK SYNCHRONIZATION
13
FEC CODING CIRCUIT
14
RTP CIRCUIT
15
UDP / IP TRANSMITTING CIRCUIT
IP
100
IP NETWORK

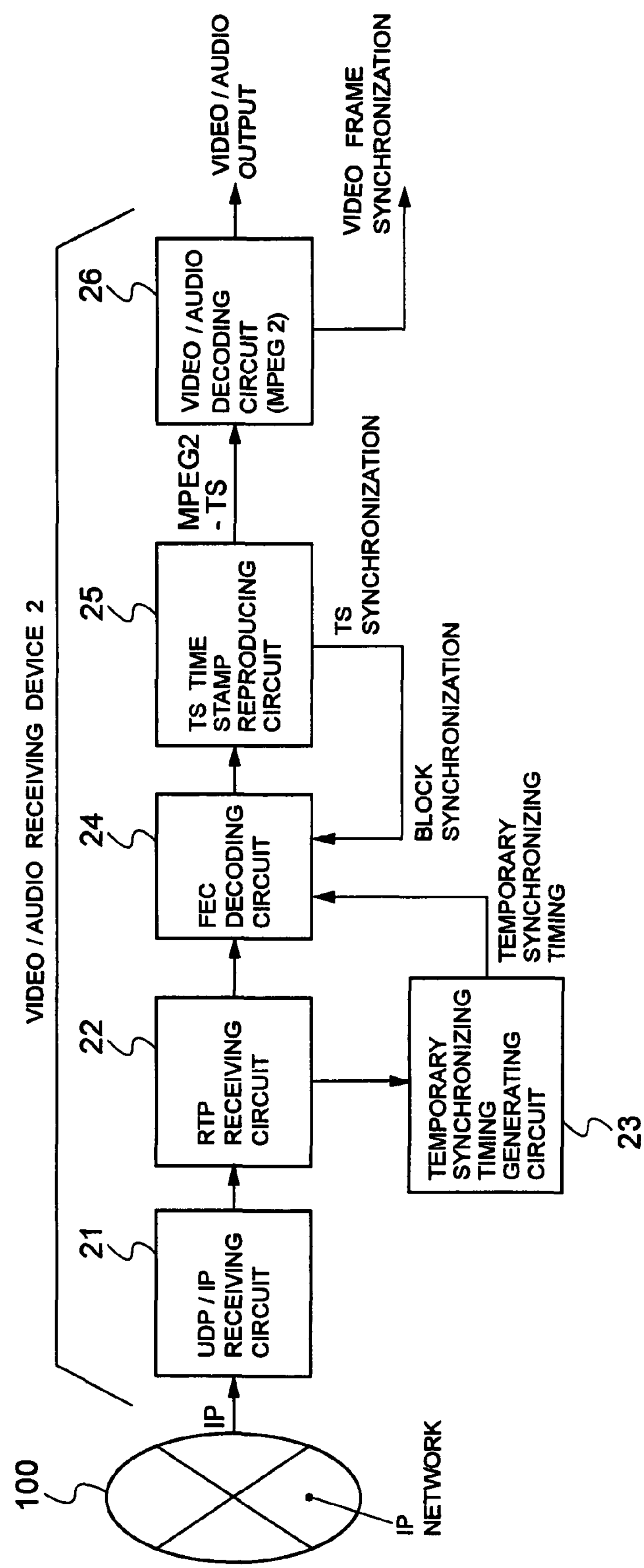
FIG. 2
VIDEO / AUDIO RECEIVING DEVICE 2
100
IP NETWORK
IP
21
UDP / IP RECEIVING CIRCUIT
22
RTP RECEIVING CIRCUIT
23
TEMPORARY SYNCHRONIZING TIMING GENERATING CIRCUIT
TEMPORARY SYNCHRONIZING TIMING
24
FEC DECODING CIRCUIT
BLOCK SYNCHRONIZATION
25
TS TIME STAMP REPRODUCING CIRCUIT
TS SYNCHRONIZATION
MPEG2 - TS
26
VIDEO / AUDIO DECODING CIRCUIT (MPEG 2)
VIDEO / AUDIO OUTPUT
VIDEO FRAME SYNCHRONIZATION VIDEO / AUDIO INPUT
VIDEO FRAME SYNCHRONIZATION
MPEG2 - TS
TS SYNCHRONIZATION
BLOCK SYNCHRONIZATION
BLOCK SYNCHRONIZATION PROCESSING
MAKING RTP
MAKING UDP / IP
t1 t2 t3
TS TIME STAMP
FEC INPUT
FEC CODE GENERATION
FEC OUTPUT

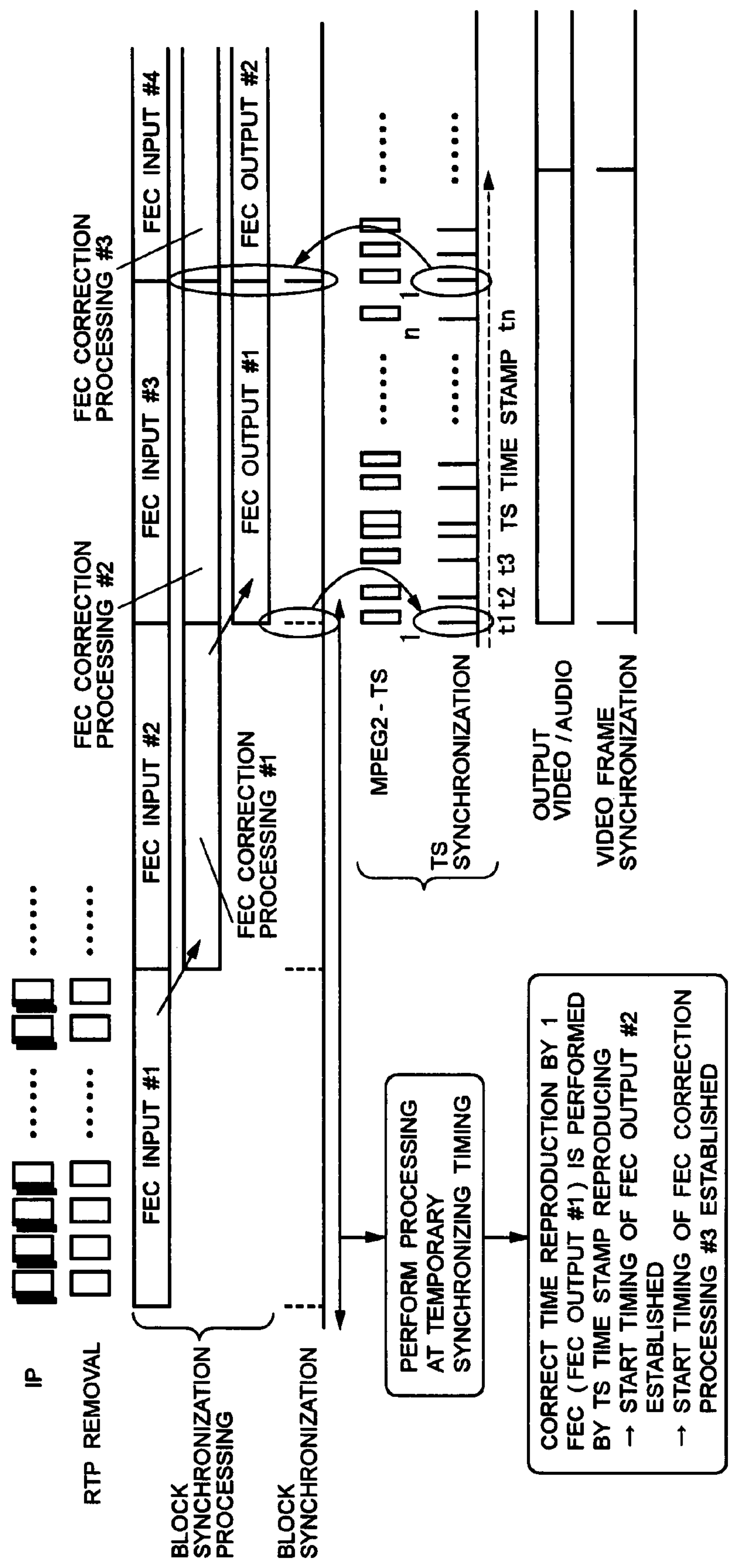
FIG. 4
IP
RTP REMOVAL
BLOCK SYNCHRONIZATION PROCESSING
BLOCK SYNCHRONIZATION
FEC INPUT #1
FEC INPUT #2
FEC INPUT #3
FEC INPUT #4
FEC CORRECTION PROCESSING #1
FEC CORRECTION PROCESSING #2
FEC CORRECTION PROCESSING #3
FEC OUTPUT #1
FEC OUTPUT #2
MPEG2 - TS
TS SYNCHRONIZATION
1
n
1
t1 t2 t3 TS TIME STAMP tn
OUTPUT VIDEO / AUDIO
VIDEO FRAME SYNCHRONIZATION
PERFORM PROCESSING AT TEMPORARY SYNCHRONIZING TIMING
CORRECT TIME REPRODUCTION BY 1 FEC ( FEC OUTPUT #1 ) IS PERFORMED BY TS TIME STAMP REPRODUCING
→ START TIMING OF FEC OUTPUT #2 ESTABLISHED
→ START TIMING OF FEC CORRECTION PROCESSING #3 ESTABLISHED TRANSMIT
RECEIVE
RECEIVING PROCESSING TIMING
IP PACKET
SYNCHRONIZING TIMING
JITTER
REVERSED
LOSS

RTP HEADER

| IP | UDP | RTP | PAYLOAD ( VIDEO / AUDIO ETC ) |
|---|---|---|---|

UNIQUE HEADER

| IP | UDP | UNIQUE | PAYLOAD ( VIDEO / AUDIO ETC ) |
|---|---|---|---|

IP STREAM TRAMSMITTING/RECEIVING SYSTEM, IP STREAM RECEIVING DEVICE AND RECEIVING PROCESS TIMING SYNCHRONIZATION METHOD USED FOR THE SAME

INCORPORATION BY REFERENCE

This application is based upon and claims the benefit of priority from Japanese patent application No. 2006-225970, filed on Aug. 23, 2006, the disclosure of which is incorporated herein in its entirety by reference.

BACKGROUND OF THE INVENTION

1. Field of the Invention

The present invention relates to an IP stream transmitting/receiving system, an IP stream receiving device and a receiving processing timing synchronization method used for the same, and specifically to timing synchronization of receiving processing of the IP (Internet Protocol) stream.

2. Description of the Related Art

When a video stream, an audio stream or the like are transmitted/received in real-time on the IP network or the like, the UDP (User Datagram Protocol) packet is generally used. For the video stream and the audio stream, coded data represented as the MPEG2 (Moving Picture Experts Group-2)-TS (Transport Stream) or the uncompressed (PCM: Pulse Code Modulation) data and the like are used.

The synchronizing timing in receiving the IP stream (for example, TS time stamp) is provided on the protocol defined at the level higher than the UDP [for example, RTP (Real-time Transport Protocol)]. In such a case, as the IP stream, a case in which an RTP header is added as shown in FIG. 8A and a case in which a unique header is added as shown in FIG. 8B are known.

The IP stream shown in FIG. 8A includes “IP header”, “UDP header”, “RTP header” and “PAYLOAD (video, audio and the like)” with synchronizing timing being inserted in the “RTP header”. The IP stream shown in FIG. 8B includes “IP header”, “UDP header”, “unique header” and “PAYLOAD (video, audio and the like)” with synchronizing timing being inserted in the “unique header”. The top of the sequence number of the RTP header or a synchronizing flag for the unique header can be used in the place of the abovementioned synchronizing timing.

FIG. 9 shows an exemplary configuration of a device for receiving an IP stream. In FIG. 9, a video/audio receiving device 3 includes an UDP/IP receiving circuit 31 for receiving an IP packet from the IP network 100, an FEC (Forward Error Correction) decoding circuit 32 for performing FEC decoding from the received IP packet, and a video/audio decoding circuit 33 for decoding the TS packet which has been FEC decoded and error corrected to output a video/audio.

The synchronizing timing of the IP stream (receiving processing timing) is required for the FEC decoding and the like (block processing, framing processing) immediately after the reception of the IP stream. Here, a block refers to a set of n TS packets. In the FEC decoding, error correction to be described later is performed and the lost TS packet is reconstructed (for example, see Japanese Patent Laid-Open No. 2005-210219).

The abovementioned synchronizing timing is controlled by adding the arrival time of the leading byte of the TS packet as the TS time stamp immediately before the packet is transmitted at the transmitter and reproducing the TS time stamp at the receiver with the FIFO (First In First Out) or the like so that, referring to the time stamp information added to the top of the TS packet, the packet interval becomes the same as that at the time when the packet is transmitted (when the TS time stamp is added). Here, the time stamp information is represented by the 27 MHz, the count value 32 bit. That is generally called as a time-stamped TS (TTS).

FIG. 10 shows an example of case of adding the TS time stamp. In the case shown in FIG. 10, assuming that the TS time stamp of a TS packet #0 is t0, the TS time stamp of a TS packet #1 is t1, and a time when the TS packet #0 is read from the FIFO is tA, the timing tB for reading the TS packet #1 from the FIFO is calculated by the following equation.

$$tB=tA+(t1-t0)$$

In the FEC processing, the “linear code” such as the Reed Solomon code or the LDPC (low density parity check) code can be generally used. Hereinafter, error correction operation at the packet level (one packet=one bit in a code word) will be described by taking the LDPC code as an example.

First, when the packets “0” to “6” are input in the FEC processing, the redundant packets “7” to “9” are created based on a preset check matrix as shown in FIG. 11. In this case, the redundant packet “7” is calculated by the exclusive OR of the packet “1”, the packet “3” and the packet “5”. The redundant packet “8” is calculated by the exclusive OR of the packet “2”, the packet “4” and the packet “6”. The redundant packet “9” is calculated by the exclusive OR of the packet “0”, the packet “3” and the packet “6”.

At the receiver, when the IP stream, in which the redundant packets “7” to “9” are added and the packets “0”, “3” and “6” are lost as shown in FIG. 12, is received, an error list is created as “0” is written at the place of the received packet based on the sequence number of the received packet. Here, an initial value of the error list is assumed as “1”. As the packets “0”, “3” and “6” are lost in this case, the error list will be “1001001000”.

When the error list and the check matrix are matched, the error list is read from the top in order and if a weight (‘1’) exists in a “column” corresponding to ‘1’ of the error list, the weight is defined as the “error weight” (encircled number). Then the number of the error weights is counted for each row (the number of row error weights).

In the example shown in FIG. 12, the number of the row error weights in the first row of the check matrix is “1”, the number of the row error weights in the second row of the check matrix is “1”, and the number of the row error weights in the third row of the check matrix is “3”. It is determined that the first and the second rows of the check matrix can be recovered based on the result. Then the lost packets “3” and “6” are recovered by the exclusive OR of the packets corresponding to weights (‘1’) other than “error weight” at each of the first and the second rows in the check matrix. In this case, the lost packet “3” is recovered by exclusive OR of the packet “1”, the packet “5” and the packet “7”. The lost packet “6” is recovered by exclusive OR of the packet “2”, the packet “4” and the packet “8”.

The abovementioned processing is called “search” in the FEC processing. By the first “search”, the lost packets “3” and “6” are recovered. Then in the FEC processing, the second “search” is performed. As the lost packets “3” and “6” are recovered at that time, the error list is updated by writing “0” in the place of the recovered packets “3” and “6” as shown in FIG. 13.

Also at the second “search”, the error list and the check matrix are matched, the error list is read from the top in order and if a weight (‘1’) exists in a “column” corresponding to ‘1’ of the error list, the weight is defined as the “error weight”

(encircled number). Then the number of the error weights is counted for each row (the number of row error weights).

In the example shown in FIG. 13, the number of the row error weights in the first row of the check matrix is "0", the number of the row error weights in the second row of the check matrix is "0", and the number of the row error weights in the third row of the check matrix is "1". It is determined that the third row of the check matrix can be recovered based on the result. Then the lost packet "0" is recovered by the exclusive OR of the packets corresponding to weights ('1') other than "error weight" at the third row in the check matrix. In this case, the lost packet "0" is recovered by exclusive OR of the packet "3", the packet "6" and the packet "9".

As mentioned above, the error correction such as the LDPC repeatedly performs searching any number of times until no pattern, to which error correction can be applied, is found. However, because the error correction processing time such as for the LDPC processing is limited in real-time processing as shown in FIG. 14 (1 FEC block time), the correction start time of each FEC block is required to be defined. In such a case, the correction start time of each FEC block is determined by the FEC outputting timing (=TS time stamp reproducing timing).

In FIG. 14, for the FEC processing, the FEC input, the FEC correction and the FEC output are sequentially performed. That is, first, the processing at the FEC input #1 is performed. When the processing at the FEC input #1 is finished, the processing at the FEC input #2 and the processing at the FEC correction #1 are performed. When the processing at the FEC input #2 is finished, the processing at the FEC input #3, the processing at the FEC correction #2 and the processing at the FEC output #1 are performed. As such, in the FEC processing, each processing of the FEC input, the FEC correction and the FEC output is sequentially performed.

If the abovementioned device for receiving an IP stream performs the error correction such as the LDPC, searching is repeated any number of times until no pattern, to which error correction can be applied, is found. However, because it has the next correction start timing for the next block, its error correction processing time is limited, particularly when the processing is performed in real-time.

When reception of the IP stream is in an unstable state due to the network jitter, the packet order changing, the packet loss or the like, it is difficult to perform the error correction in a stable and effective manner. Specifically, the error correction processing time may not be sufficiently afforded. If a time for receiving the prior block is extended due to the network jitter, the error correction processing time of the block subsequent to the prior block cannot be sufficiently afforded. If the error correction processing time is shortened, the number of repeats of the search is decreased. That deteriorates the error correction efficiency.

BRIEF SUMMARY OF THE INVENTION

It is an exemplary object of the present invention to eliminate the abovementioned problems and provide an IP stream transmitting/receiving system, an IP stream receiving device and a receiving processing timing synchronization method used for the same that can generate a signal timing, which is synchronized with the transmitting side, even under the unstable state in receiving the IP stream so as to stabilize the processing timing and the error correction processing efficiency.

An IP (Internet Protocol) stream transmitting/receiving system according to an exemplary aspect of the present invention is an IP stream transmitting/receiving system including an IP stream receiving device for performing, at a receiving processing timing of an IP stream, at least FEC (Forward Error Correction) decoding of a received IP stream, wherein the IP stream receiving device includes a circuit for generating the receiving processing timing based on TS (Transport Stream) synchronization that is established in TS time stamp reproducing processing at the latter stage of the FEC decoding processing.

An IP (Internet Protocol) stream receiving device according to an exemplary aspect of the present invention is an IP stream receiving device for performing at least FEC (Forward Error Correction) decoding of a received IP stream at a receiving processing timing of the received IP stream, including:

a circuit for generating the receiving processing timing based on TS (Transport Stream) synchronization that is established in TS time stamp reproducing processing at a latter stage of the FEC decoding processing.

A receiving processing timing synchronization method according to an exemplary aspect of the present invention is a receiving processing timing synchronization method used in an IP (Internet Protocol) stream transmitting/receiving system including an IP stream receiving device for performing at least an FEC (Forward Error Correction) decoding of a received IP stream at a receiving processing timing of the received IP stream, wherein the method including:

at the IP stream receiving device, generating the receiving processing timing based on TS (Transport Stream) synchronization that is established in TS time stamp reproducing processing at a latter stage of the FEC decoding processing.

BRIEF DESCRIPTION OF THE DRAWINGS

FIG. 2 is a block diagram showing an exemplary configuration of an IP stream receiving device according to the exemplary embodiment of the present invention;

FIG. 4 is a timing chart showing processing operations of a video/audio receiving device in FIG. 2;

DETAILED DESCRIPTION OF EXEMPLARY EMBODIMENTS

Figure 1:
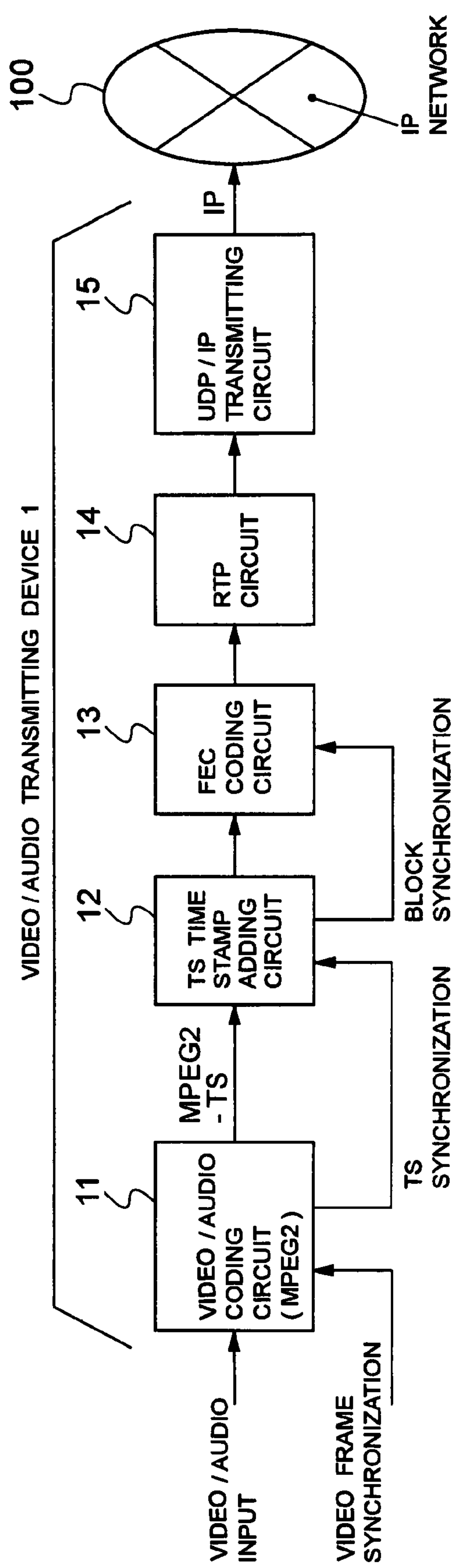
FIG. 1 is a block diagram showing an exemplary configuration of an IP stream transmitting device according to an exemplary embodiment of the present invention.

Now, exemplary embodiments of the present invention will be described with reference to the drawings. FIG. 1 is a block diagram showing an exemplary configuration of an IP stream transmitting device according to a first exemplary embodiment of the present invention. FIG. 2 is a block diagram showing an exemplary configuration of an IP stream receiving device according to the first exemplary embodiment of the present invention. FIGS. 1 and 2 show the configurations of a video/audio transmitting device 1 and a video/audio receiving device 2 as the IP stream transmitting device and the IP stream receiving device.

In FIG. 1, the video/audio transmitting device 1 includes a video/audio coding circuit (Moving Pictures Expert Group-2) 11 for coding a video/audio based on the video/audio input and the video frame synchronization; a TS time stamp adding circuit 12 for adding the TS time stamp to an MPEG2-TS (Transport Stream) packet (hereinafter referred to as a TS packet) from the video/audio coding circuit 11; an FEC (Forward Error Correction) coding circuit 13 for adding a redundant packet to the TS packet; an RTP (Real-time Transport Protocol) circuit 14 for adding an RTP header to the TS packet; and a UDP/IP transmitting circuit 15 for transmitting the TS packet with a UDP (User Datagram Protocol) header and an IP (Internet Protocol) header added to the IP network 100.

The video/audio coding circuit 11 codes a video/audio based on the video/audio input and the video frame synchronization, and sends out the TS packet and the TS synchronization to the TS time stamp adding circuit 12. When the TS time stamp adding circuit 12 receives the TS packet and the TS synchronization, it adds the arrival time of the leading byte of the TS packet to the TS packet as the TS time stamp immediately before it sends the TS packet, and then sends out the TS packet to the FEC coding circuit 13. When the n cycles of the TS synchronization have passed, the TS time stamp adding circuit 12 sends out the block synchronization to the FEC coding circuit 13.

When the FEC coding circuit 13 receives the TS packet and the block synchronization, it generates the redundant packet to be added to the TS packet, adds the redundant packet to the TS packet and sends it out to the RTP circuit 14 as described in the Related Art. The RTP circuit 14 adds an RTP header to the TS packet. The UDP/IP transmitting circuit 15 adds a UDP header and an IP header to the TS packet to transmit the TS packet to the IP network 100 as an IP packet.

In FIG. 2, the video/audio receiving device 2 includes a UDP/IP receiving circuit 21 for receiving an IP packet from the IP network 100; an RTP receiving circuit 22 for retrieving a TS packet by removing the RTP header from the received IP packet; a temporary synchronizing timing generating circuit 23 for generating temporary synchronizing timing from a predetermined number (for example, five blocks) of dummy TS packets; an FEC decoding circuit 24 for performing FEC decoding of the TS packet; a TS time stamp reproducing circuit 25 for extracting the TS time stamp from the TS packet, which has been FEC decoded and error corrected, and generating the TS synchronization; and a video/audio decoding circuit (MPEG2) 26 for decoding the TS packet which has been FEC decoded and error corrected to output a video/audio.

When the UDP/IP receiving circuit 21 receives the IP packet from the IP network 100, it removes the UDP header and the IP header from the IP packet and sends out the IP packet to the RTP receiving circuit 22. The RTP receiving circuit 22 removes the RTP header from the TS packet, from which the UDP header and the IP header have been removed, and retrieves the TS packet. The RTP receiving circuit 22 sends out dummy TS packets by a predetermined number from the top of the TS packets to the temporary synchronizing timing generating circuit 23 and sends out the TS packets thereafter to the FEC decoding circuit 24.

The temporary synchronizing timing generating circuit 23 measures the synchronizing timing (receiving processing timing) of the predetermined number of dummy TS packets, and provides the averaged measurement for the FEC decoding circuit 24 as the temporary synchronizing timing. The FEC decoding circuit 24 performs the error correction on the TS packet (recovering of the TS packet and the like) by performing the FEC input processing, the FEC correction processing and the FEC output processing as described in the Related Art, and sends the TS packet, on which the error correction is performed, to the TS time stamp reproducing circuit 25.

The TS time stamp reproducing circuit 25 sends the TS packet, which has been FEC decoded and error corrected, to the video/audio decoding circuit 26, generates the TS synchronization by extracting the TS time stamp from the TS packet, and provides the block synchronization to the FEC decoding circuit 24 each time when n cycles of the TS synchronization have passed. When the video/audio decoding circuit 26 receives the TS packet, it performs decoding processing on the TS packet to output a video/audio to the other circuit (not shown) and also reproduces the video frame synchronization to output it to the other circuit.

Until the block synchronization is received from the TS time stamp reproducing circuit 25, the FFC decoding circuit 24 performs the FEC input processing, the FEC correction processing, and the FEC output processing in sync with the temporary synchronizing timing from the temporary synchronizing timing generating circuit 23. When the block synchronization is received, the FEC decoding circuit 24 performs the FEC input processing, the FEC correction processing and the FEC output processing in sync with the block synchronization.

Figure 3:
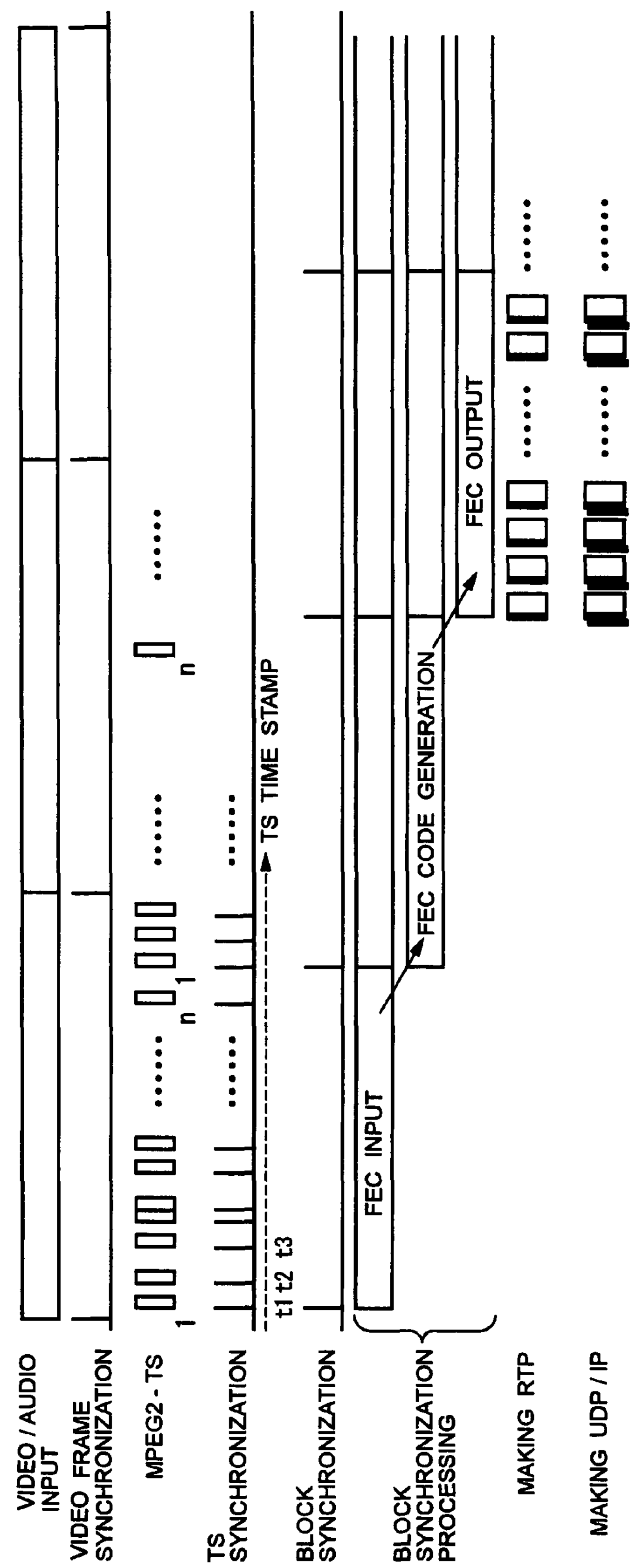
FIG. 3 is a timing chart showing processing operations of a video/audio transmitting device in FIG. 1.
Figure 5:
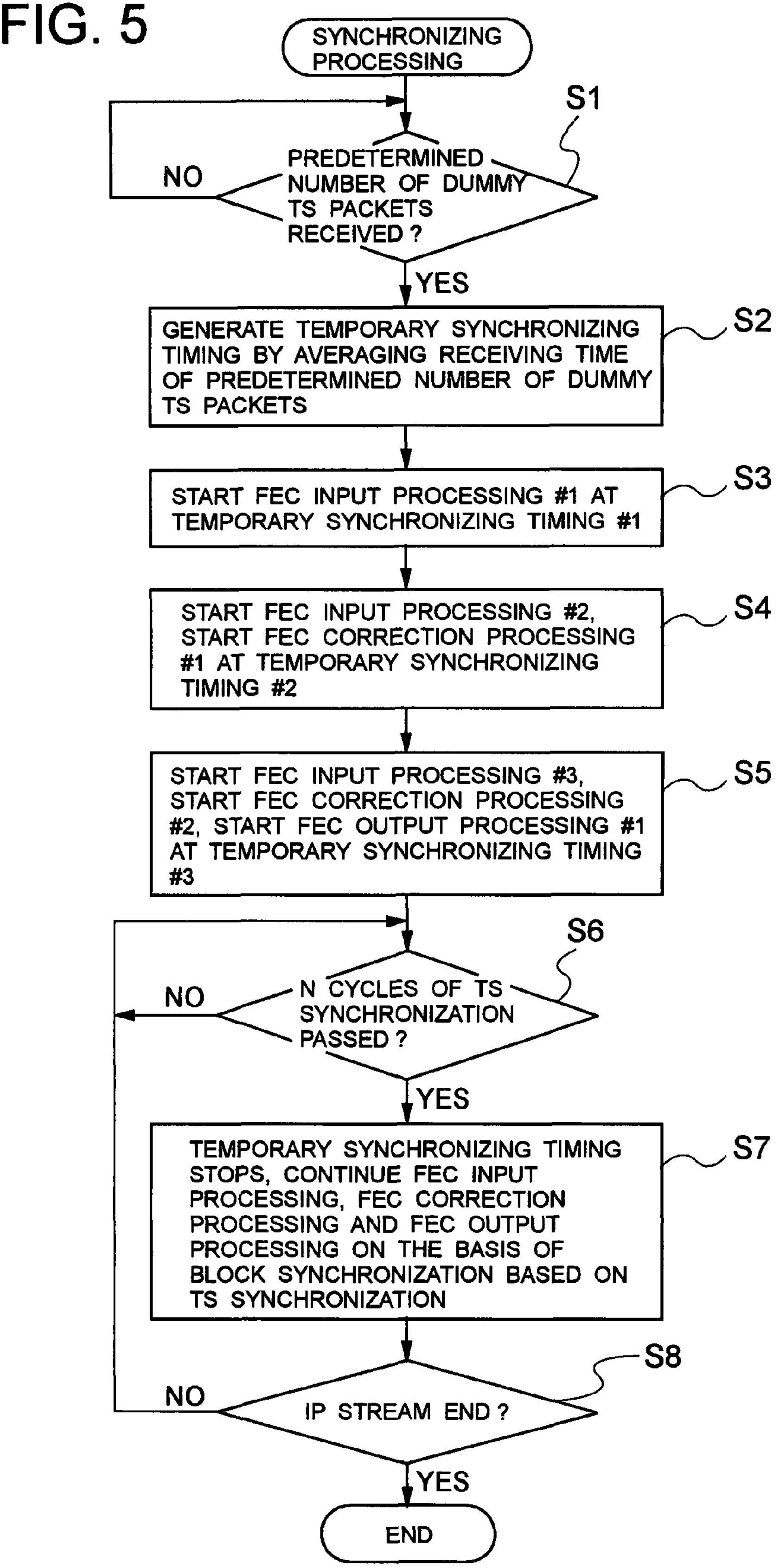
FIG. 5 is a flowchart showing processing operations of the video/audio receiving device in FIG. 2.

FIG. 3 is a timing chart showing processing operations of the video/audio transmitting device 1 in FIG. 1. FIG. 4 is a timing chart showing processing operations of the video/audio receiving device 2 in FIG. 2. FIG. 5 is a flowchart showing processing operations of the video/audio receiving device 2 in FIG. 2. Operations of the IP stream transmitting/receiving system according to the first exemplary embodiment of the present invention will be described with reference to FIGS. 1 to 5.

In the video/audio transmitting device 1, the video/audio coding circuit 11 performs coding processing on a video/audio based on the video/audio input and video frame synchronization, and sends out the TS packet (1, . . . , n) and the TS synchronization (t1, t2, t3, . . . ) to the TS time stamp adding circuit 12 as shown in FIG. 3.

When the TS time stamp adding circuit 12 receives the TS packet and the TS synchronization, it adds the arrival time of the leading byte of the TS packet to the TS packet as the TS time stamp immediately before it sends the TS packet, and sends out the TS packet to the FEC coding circuit 13. The TS time stamp adding circuit 12 sends the block synchronization to the FEC coding circuit 13 when n cycles of the TS synchronization have passed.

Figure 11:
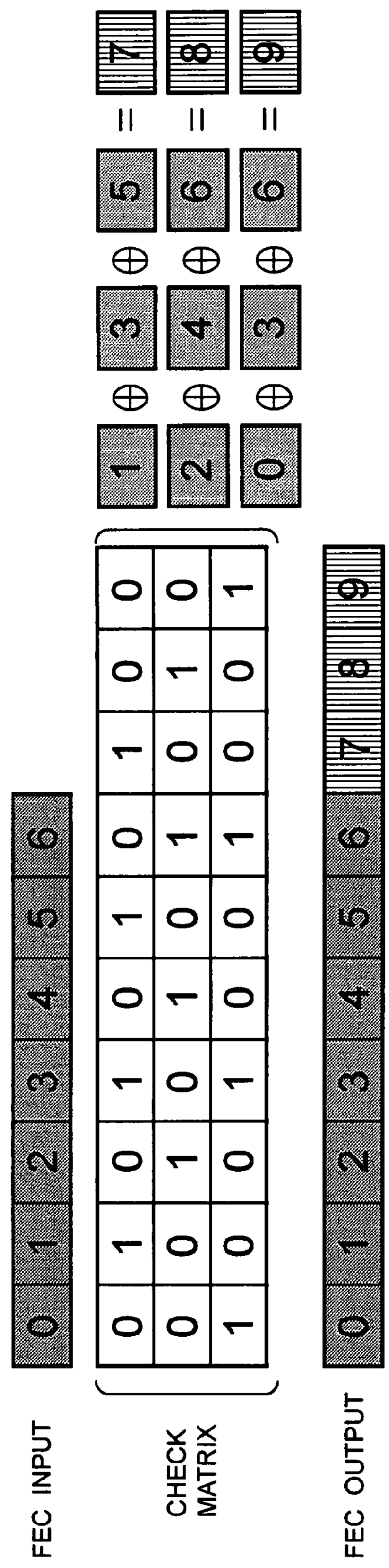
FIG. 11 is a diagram showing a FEC processing of a related art.

When the FEC coding circuit 13 receives the TS packet and the block synchronization, it performs the block synchronization processing including the FEC input processing, the FEC code generating processing, and the FEC output processing. In such a case, the FEC coding circuit 13 generates a redundant packet to be added to the TS packet in the FEC code generating processing as described in the Related Art (see FIG. 11), and adds the redundant packet to the TS packet and sends it to the RTP circuit 14.

The TS packet with the redundant packet added has the RTP header added (RTP making) at the RTP circuit 14, has the UDP header and the IP header added (UDP/IP making) at the UDP/IP transmitting circuit 15 and is transmitted to the IP network 100 as the IP packet.

In the video/audio receiving device 2, when the UDP/IP receiving circuit 21 receives the IP packet from the IP network 100 as shown in FIG. 4, it removes the UDP header and the IP header from the IP packet and sends out the IP packet to the RTP receiving circuit 22. The RTP receiving circuit 22 removes the RTP header from the packet, from which the UDP header and the IP header has been removed, and retrieves the TS packet. The RTP receiving circuit 22 sends out dummy TS packets by a predetermined number from the top of the TS packets to the temporary synchronizing timing generating circuit 23 and sends out the TS packets thereafter to the FEC decoding circuit 24.

Figure 12:
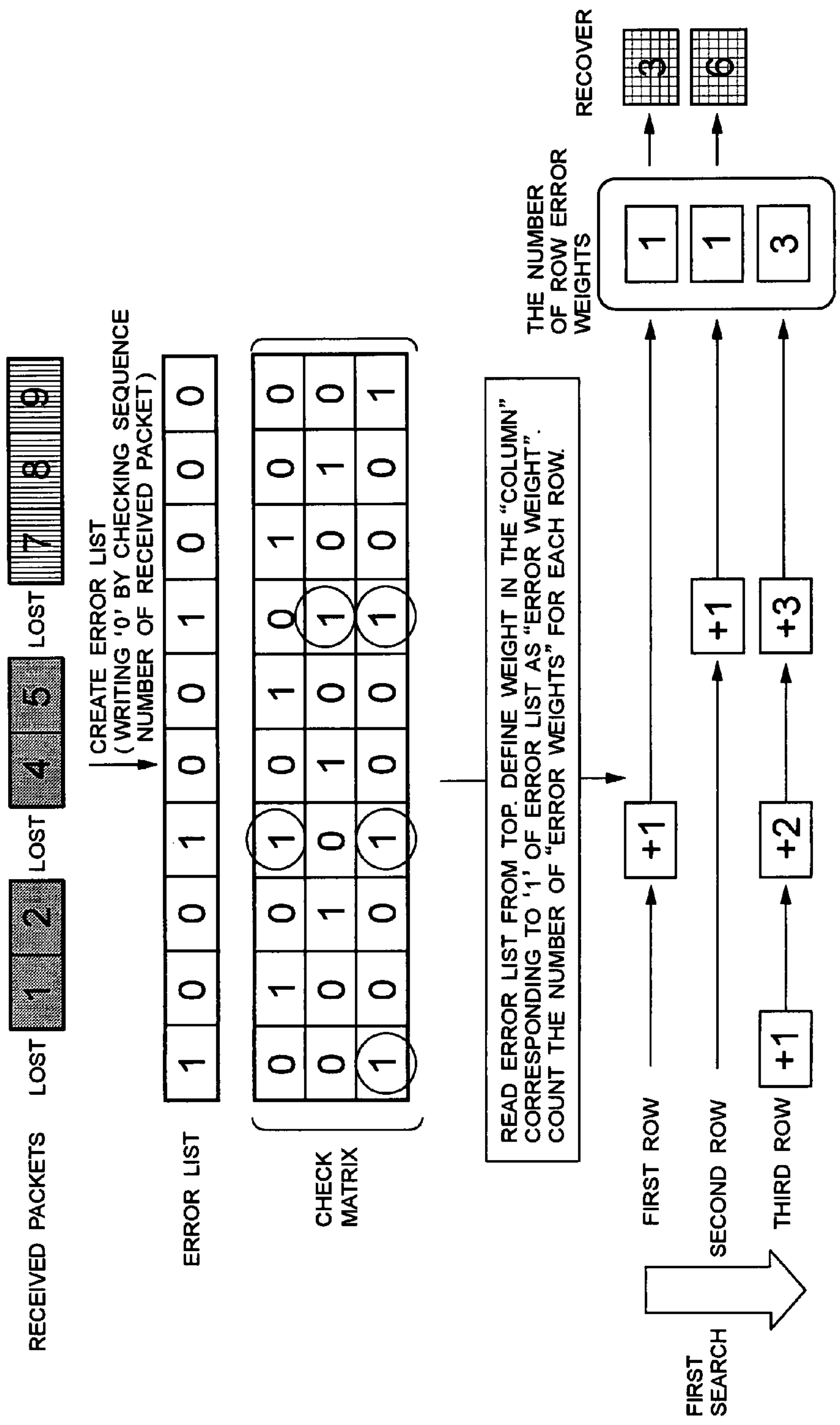
FIG. 12 is a diagram showing a FEC processing of a related art.
Figure 13:
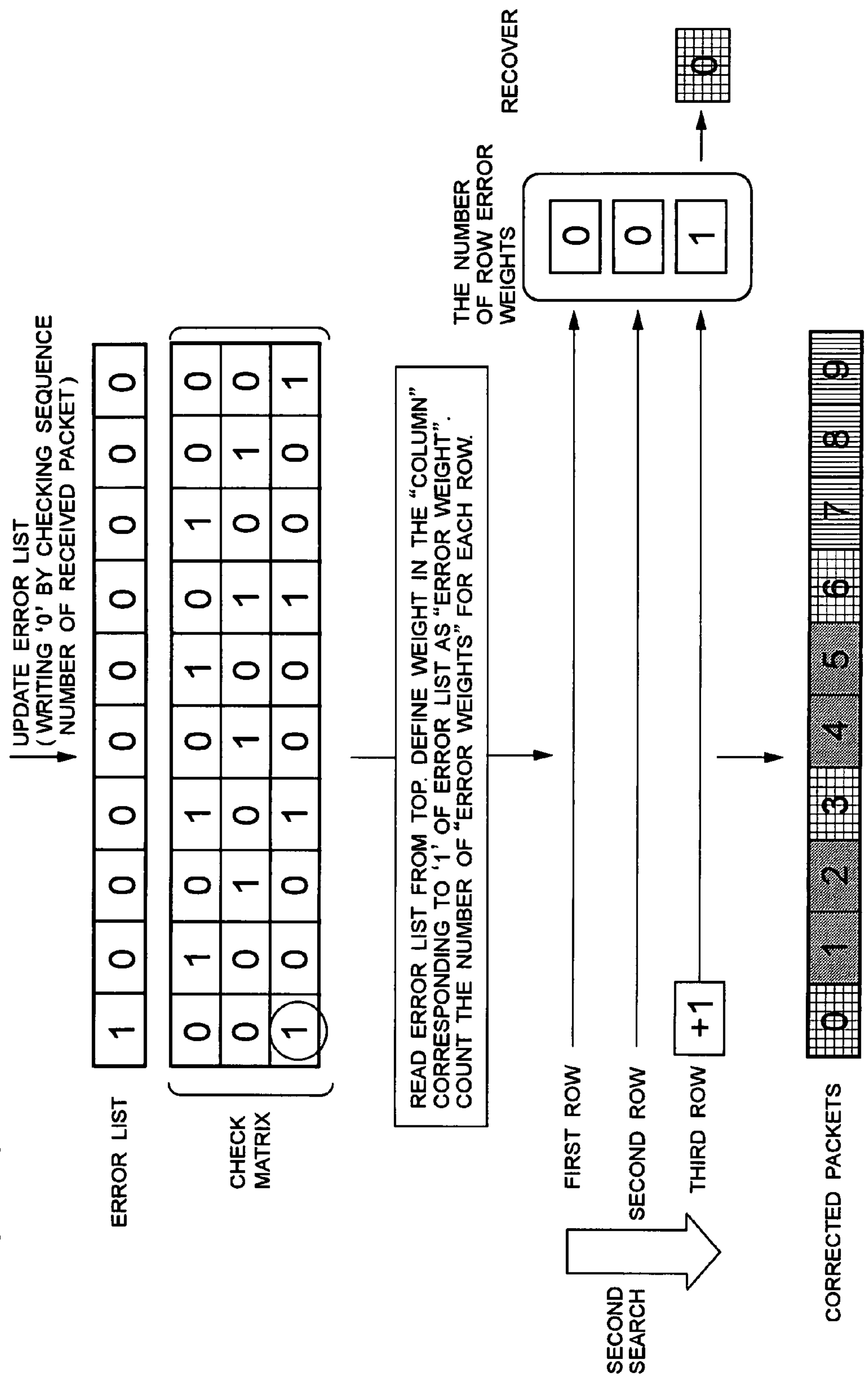
FIG. 13 is a diagram showing a FEC processing of a related art.
Figure 14:
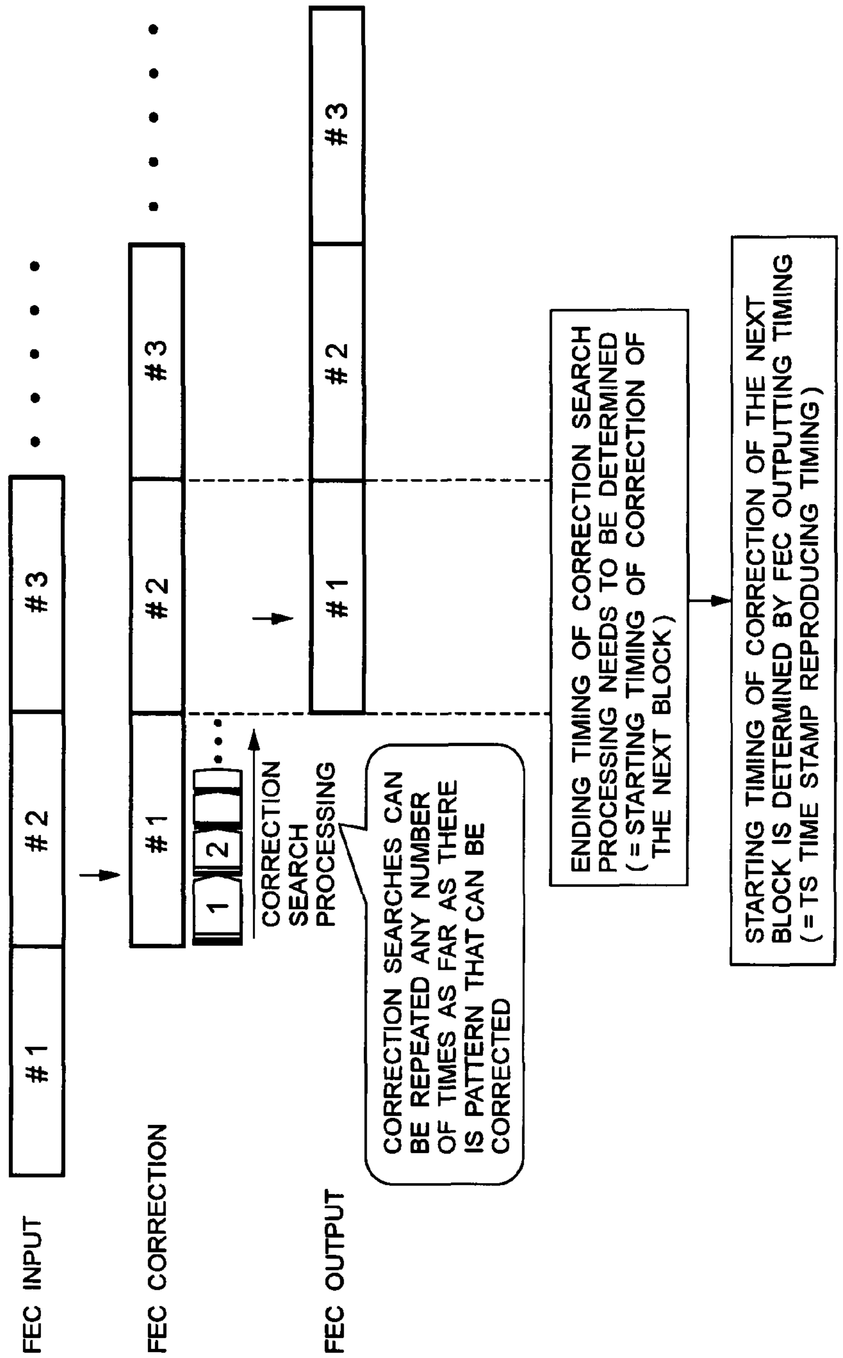
FIG. 14 is a diagram showing a flow of a FEC processing of a related art.

The temporary synchronizing timing generating circuit 23 measures the synchronizing timing (receiving processing timing) of the predetermined number of dummy TS packets, and provides the averaged measurement to the FEC decoding circuit 24 as the temporary synchronizing timing. The FEC decoding circuit 24 performs the error correction on the TS packet (recovering of the TS packet and the like) by performing the FEC input processing (FEC input #1, #2, #3, #4, . . . ), the FEC correction processing (FEC correction processing #1, #2, #3, . . . ) and the FEC output processing (FEC output #1, #2, . . . ) as described in the Related Art (see FIG. 12 and FIG. 13), and sends the TS packet, on which the error correction is performed, to the TS time stamp reproducing circuit 25.

The TS time stamp reproducing circuit 25 sends the TS packet (1, . . . , n), which has been FEC decoded and error corrected, to the video/audio decoding circuit 26, generates the TS synchronization (t1, t2, t3, . . . , tn) by extracting the TS time stamp from the TS packet, and provides the block synchronization to the FEC decoding circuit 24 each time when n cycles of the TS synchronization have passed. In the first exemplary embodiment, correct time reproduction by 1 FEC (FEC output #1) is achieved by the first TS time stamp reproduction of the TS time stamp reproducing circuit 25 so that the start timings of the FEC output #2 and the FEC correction processing #3 are established.

When the video/audio decoding circuit 26 receives the TS packet, it performs decoding processing on the TS packet to output a video/audio to the other circuit (not shown) and also reproduces the video frame synchronization to output it to the other circuit.

The FEC decoding circuit 24 starts the FEC input processing (FEC input #1, #2, #3), the FEC correction processing (FEC correction processing #1, #2) and the FEC output processing (FEC output #1) in sync with the temporary synchronizing timing from the temporary synchronizing timing generating circuit 23 until the block synchronization is received from the TS time stamp reproducing circuit 25. When the block synchronization is received, the FEC decoding circuit 24 starts the FEC input processing (FEC input #4), the FEC correction processing (FEC correction processing #3), and the FEC output processing (FEC output #2) in sync with the block synchronization.

Now, processing operations of the video/audio receiving device 2 will be described with reference to FIG. 5. In the video/audio receiving device 2, synchronization processing is started. When the temporary synchronizing timing generating circuit 23 receives the predetermined number of dummy TS packets from the video/audio transmitting device 1 (step S1 in FIG. 5), it measures the synchronization timing (receiving processing timing) of the predetermined number of dummy TS packets, and generates the temporary synchronizing timing by averaging the receiving time of the predetermined number of dummy TS packets (step S2 in FIG. 5).

In the video/audio receiving device 2, the FEC decoding circuit 24 starts the FEC input processing #1 at the temporary synchronizing timing #1 as shown in FIG. 4 (step S3 in FIG. 5), and starts the FEC input processing #2 and the FEC correction processing #1 at the temporary synchronizing timing #2 as shown in FIG. 4 (step S4 in FIG. 5).

In the video/audio receiving device 2, the FEC decoding circuit 24 starts the FEC input processing #3, the FEC correction processing #2 and the FEC output processing #1 at the temporary synchronizing timing #3 as shown in FIG. 4 (step S5 in FIG. 5). Thereafter, in the video/audio receiving device 2, when n cycles of the TS synchronization have passed (step S6 in FIG. 5), the temporary synchronizing timing is stopped at the temporary synchronizing timing generating circuit 23, and the TS synchronization is generated at the TS time stamp reproducing circuit 25 by the FEC output processing #1 in the FEC decoding circuit 24. Therefore, the FEC decoding circuit 24 continues the FEC input processing, the FEC correction processing and the FEC output processing on the basis of the block synchronization based on the TS synchronization as shown in FIG. 4 (step S7 in FIG. 5).

When the IP stream ends by the continued FEC input processing, the FEC correction processing, and the FEC output processing in the FEC decoding circuit 24 (step S8 in FIG. 5), the synchronization processing ends. If the IP stream does not end (step S8 in FIG. 5), the operation returns to step S6, where the block synchronization is sent out each time when n cycles of the TS synchronization have passed so that the FEC input processing, the FEC correction processing, and the FEC output processing continue in the FEC decoding circuit 24.

Figure 6:
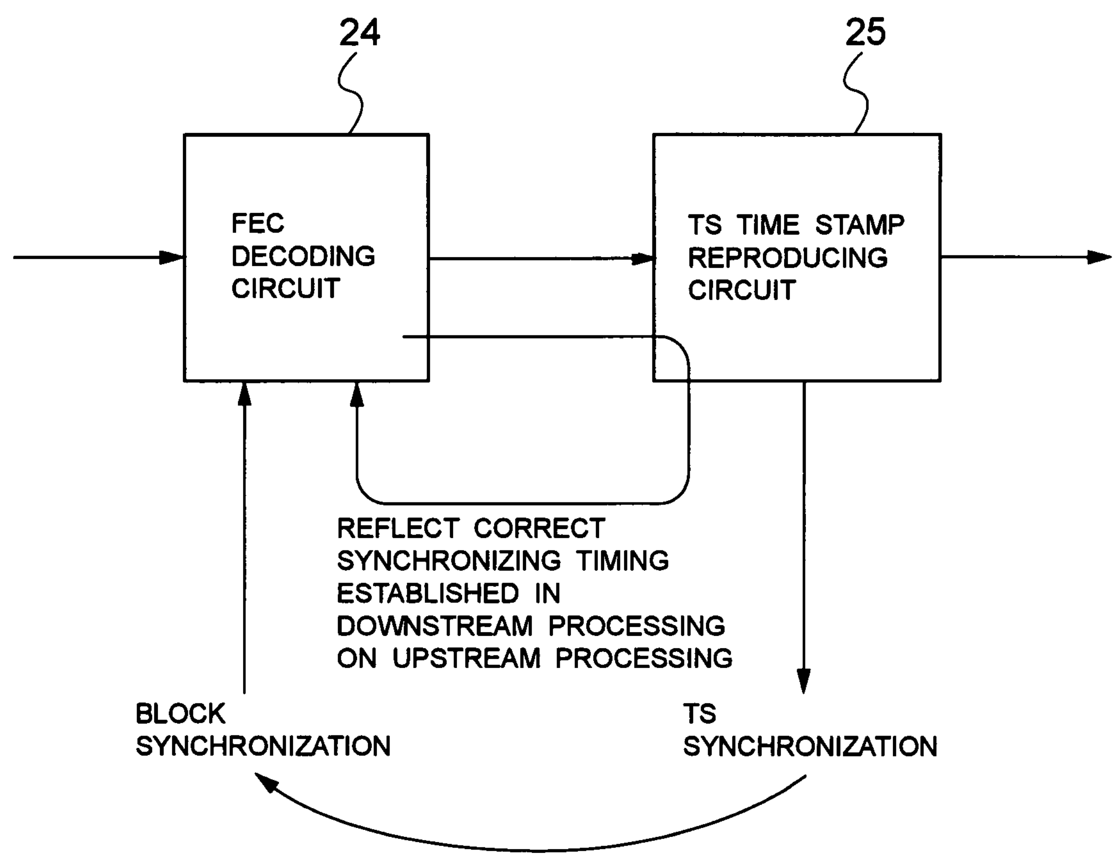
FIG. 6 is a diagram for illustrating operations after a TS synchronization is performed by FEC output processing #1 of an FEC decoding circuit according to the exemplary embodiment of the present invention.
Figure 7:
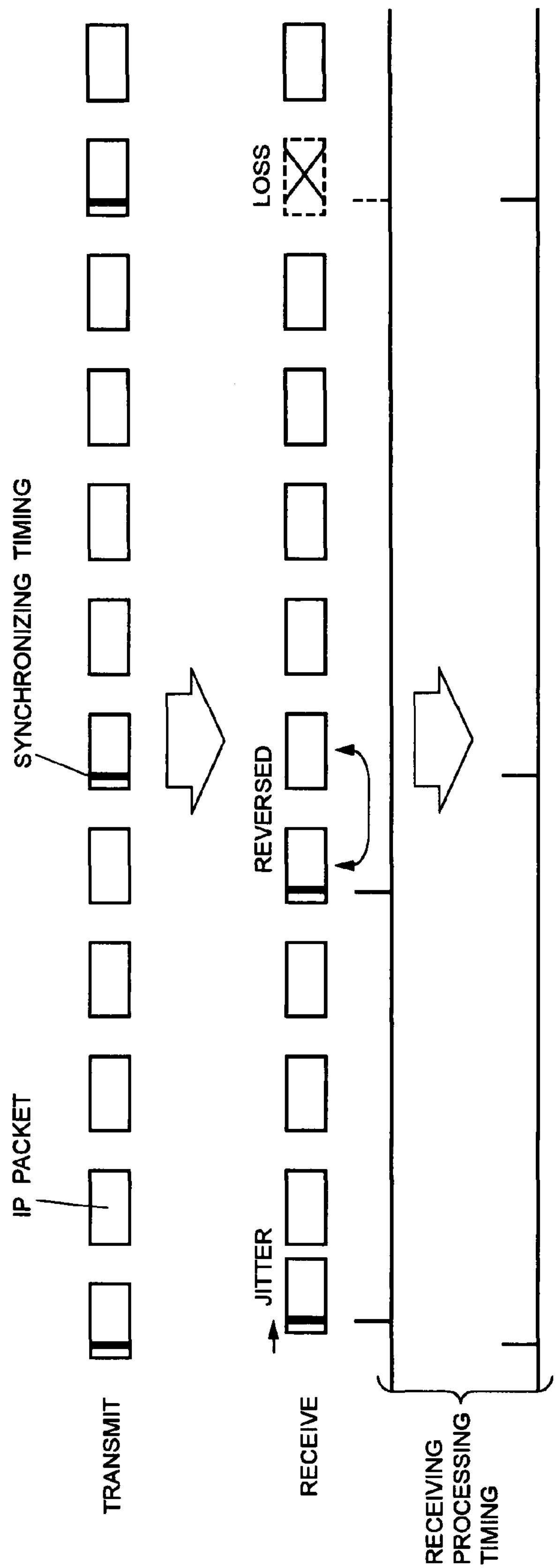
FIG. 7 is a diagram for illustrating effects according to the exemplary embodiment of the present invention.
Figures 8A, 8B, 9:
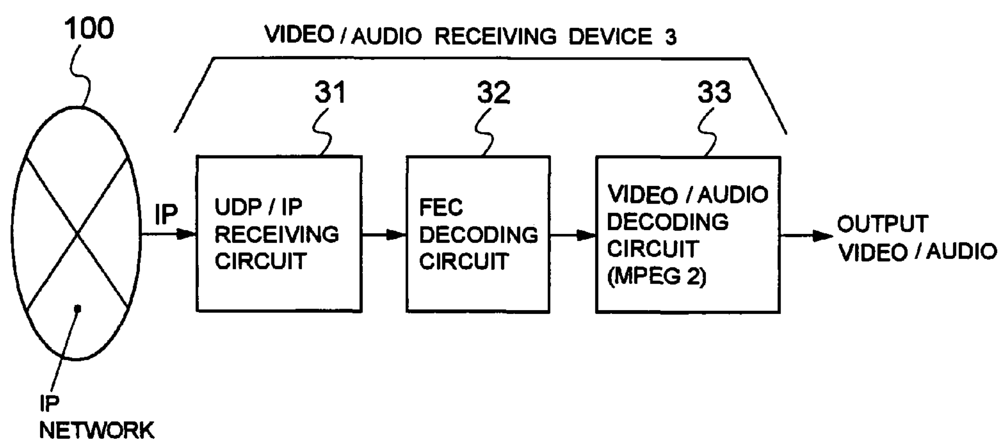
FIGS. 8A and 8B are diagrams showing exemplary arrangements of an IP stream of a related art.
FIG. 9 is a block diagram showing an exemplary configuration of an IP stream receiving device of a related art.
Figure 10:
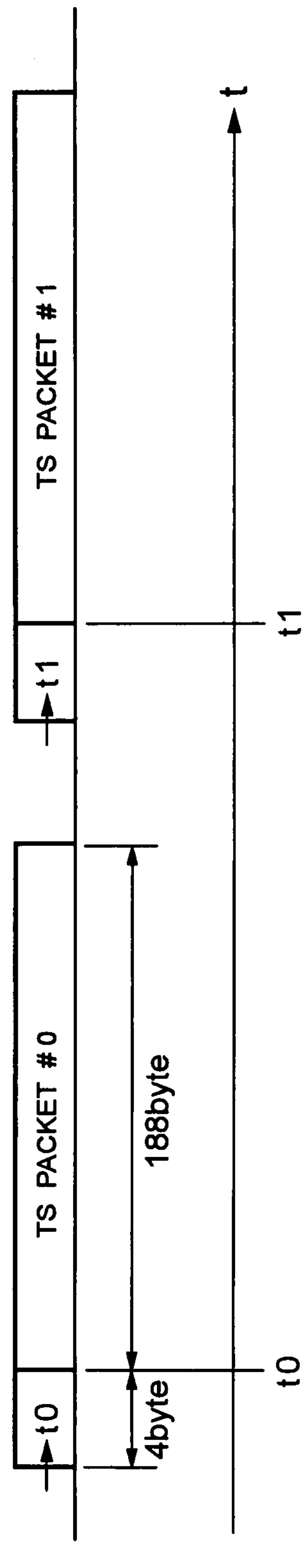
FIG. 10 is a diagram showing an example of case of adding a TS time stamp of a related art.

FIG. 6 is a diagram for illustrating operations after the TS synchronization is generated at the TS time stamp reproducing circuit 25 by the FEC output processing #1 of the FEC decoding circuit 24 according to the first exemplary embodiment of the present invention. FIG. 7 is a diagram for illustrating effects according to the first exemplary embodiment of the present invention.

In the first exemplary embodiment, a correct receiving processing timing (block synchronization) is generated as mentioned above. As shown in FIG. 6, the output of the TS packets at correct time intervals, i.e. the correct TS synchronization generation is performed based on the time information, which is added to each TS packet, at the TS time stamp reproducing circuit 25.

Therefore, in the first exemplary embodiment, when n cycles of the TS synchronization have passed, "FEC output processing #1 completion", "FEC output processing #2 start", and the "FEC correction processing #3 start" are performed. When further n cycles of the TS synchronization have passed, "FEC output processing #2 completion", "FEC output processing #3 start" and "FEC correction processing #4 start" are performed.

Hereinafter, in the first exemplary embodiment, as the correct synchronizing timing established in the downstream processing (processing in the TS time stamp reproducing circuit 25) is reflected on the upstream processing (processing in the FEC decoding circuit 24), as shown in FIG. 6, the FEC output processing and the FEC correction processing are performed correctly at each time when n cycles of the TS synchronization have passed.

Accordingly, as the FEC processing start timing is defined by the correct TS synchronizing timing in the first exemplary embodiment, the processing timing can be stabilized. As the correct synchronizing timing established in the downstream processing (the processing in the TS time stamp reproducing circuit 25) is used in the first exemplary embodiment as shown in FIG. 7, the first exemplary embodiment is not affected from the network jitter, the packet loss or the like at the time of the IP stream reception.

An IP (Internet Protocol) stream transmitting/receiving system according to a second exemplary embodiment of the present invention stably generates a signal timing that is synchronized with the transmitting side even when a received IP stream becomes unstable due to the network jitter, the packet order changing, the packet loss or the like. Here, the received IP stream is the UDP (Use Datagram Protocol) packet with the contents of a video stream, an audio stream or the like, and the video stream and the audio stream are coded data represented as the MPEG2 (Moving Picture Experts Group-2)-TS (Transport Stream), uncompressed (PCM: Pulse Code Modulation) data or the like.

The synchronizing timing in the receiving processing of the IP stream (for example, the TS time stamp) is provided on the protocol defined at the level higher than the UDP [for example, RTP (Real-time Transport Protocol)]. The top of the sequence number of the RTP header or a synchronizing flag of the unique header can be used in the place of the abovementioned synchronizing timing.

The synchronizing timing (receiving processing timing) is required for the FEC (Forward Error Correction) decoding (block processing, framing processing) immediately after the reception of the IP stream. Here, a block refers to a set of n TS packets.

To describe more specifically, in the IP stream transmitting/receiving system according to the second exemplary embodiment of the present invention, the correct receiving processing timing (block synchronization) is generated based on the TS synchronization that is established in TS time stamp reproducing processing at the latter stage of the FEC decoding processing. That is, TS packets are output from a TS time stamp reproducing circuit at correct time intervals based on time information added on each TS packet, and the block synchronization is generated based on the correct TS synchronization to provide the FEC decoding processing with the block synchronization.

If the FEC output processing #1 ends when the n cycles of the TS synchronization have passed, the FEC output processing #2 starts and the FEC correction processing #3 starts. In this case, the FEC input processing #4 starts. Further, if the FEC output processing #2 ends at the time when n cycles of the TS synchronization have passed, the FEC output processing #3 starts and the FEC correction processing #4 starts.

Accordingly, as the IP stream transmitting/receiving system according to the second exemplary embodiment of the present invention defines the start timing of the FEC decoding processing based on the abovementioned correct TS synchronizing timing, it can stabilize the processing timing so as not to be affected by the network jitter of the received IP stream, the packet loss or the like. That is, the IP stream transmitting/receiving system according to the second exemplary embodiment of the present invention can stably generate a signal timing, which is synchronized with the transmitting side, even when the received IP stream is under an unstable state due to the network jitter, the packet order changing, the packet loss or the like.

In the IP stream transmitting/receiving system according to the second exemplary embodiment of the present invention, the transmitter transmits a dummy IP stream by a predetermined number before it transmits the actual IP stream, the receiver measures the synchronizing timing of the dummy IP stream (receiving processing timing) and provides the averaged measurement for the FEC decoding processing as the temporary synchronizing timing until the abovementioned correct TS synchronization is obtained. The FEC input processing, the FEC correction processing and the FEC output processing are performed in sync with the temporary synchronizing timing to obtain the TS synchronization.

An exemplary advantage according to the invention is that a signal timing which is synchronized with the transmitting side can be generated stably, even under the unstable state in receiving an IP stream so as to stabilize the processing timing and the error correction processing efficiency.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An IP (Internet Protocol) stream transmitting/receiving system comprising an IP stream receiving device for performing, at a receiving processing timing of an IP stream, at least FEC (Forward Error Correction) decoding of a received IP stream, wherein the IP stream receiving device comprises a circuit for generating the receiving processing timing based on TS (Transport Stream) synchronization that is established in TS time stamp reproducing processing by extracting time information from TS packets which have been FEC-decoded in the FEC decoding processing.

2. The IP stream transmitting/receiving system according to claim 1, wherein the circuit outputs the TS packets at time intervals based on time information added to each TS packet, and generates block synchronization on the basis of the TS synchronization that is established based on the time information in the TS time stamp reproducing processing to provide the FEC decoding processing with the block synchronization.

3. The IP stream transmitting/receiving system according to claim 1, wherein the receiving processing timing is generated by using at least any of a TS time stamp added to the TS packet, a top of a sequence number of an RTP (Real-time Transport Protocol) header of the received IP stream, and a synchronizing flag of a unique header of the received IP stream.

4. The IP stream transmitting/receiving system according to claim 1, wherein the IP stream receiving device comprises a circuit for measuring a receiving processing timing of a predetermined number of dummy TS packets, and generating a temporary synchronizing timing based on the measurement to provide the FEC decoding processing with the temporary synchronizing timing; and the FEC decoding processing is performed at the temporary synchronizing timing until the TS synchronization is established.

5. The IP stream transmitting/receiving system according to claim 1, wherein the received IP stream is a UDP (User Datagram Protocol) packet of at least a video and audio stream.

6. The IP stream transmitting/receiving system according to claim 5, wherein the video and audio stream is coded data and uncompressed data including an MPEG2 (Moving Picture Experts Group-2)-TS (Transport Stream).

7. The IP stream transmitting/receiving system according to claim 1, wherein the FEC decoding processing is for sequentially performing FEC input processing, FEC correction processing, and FEC output processing; and after the FEC output processing is performed, the TS synchronization is established in the TS time stamp reproducing processing.

8. An IP (Internet Protocol) stream receiving device for performing at least FEC (Forward Error Correction) decoding of a received IP stream at a receiving processing timing of the received IP stream, comprising:

a circuit for generating the receiving processing timing based on TS (Transport Stream) synchronization that is established in TS time stamp reproducing processing by extracting time information from TS packets which have been FEC-decoded in the FEC decoding processing.

9. The IP stream receiving device according to claim 8, wherein the circuit outputs the TS packets at time intervals based on time information added to each TS packet, and generates block synchronization on the basis of the TS synchronization that is established based on the time information in the TS time stamp reproducing processing to provide the FEC decoding processing with the block synchronization.

10. The IP stream receiving device according to claim 8, wherein the receiving processing timing is generated by using at least any of a TS time stamp added to the TS packet, a top of a sequence number of an RTP (Real-time Transport Protocol) header of the received IP stream, and a synchronizing flag of a unique header of the received IP stream.

11. The IP stream receiving device according to claim 8, comprising:

a circuit for measuring a receiving processing timing of a predetermined number of dummy TS packets, and generating a temporary synchronizing timing based on the measurement to provide the FEC decoding processing with the temporary synchronizing timing; wherein the FEC decoding processing is performed at the temporary synchronizing timing until the TS synchronization is established.

12. The IP stream receiving device according to claim 8, wherein the received IP stream is a UDP (User Datagram Protocol) packet of at least a video and audio stream.

13. The IP stream receiving device according to claim 12, wherein the video and audio stream is coded data and uncompressed data including an MPEG2 (Moving Picture Experts Group-2)-TS (Transport Stream).

14. The IP stream receiving device according to claim 8, wherein

FEC input processing, FEC correction processing, and FEC output processing are sequentially performed in the FEC decoding processing; and the TS synchronization is established in the TS time stamp reproducing processing, after the FEC output processing is performed.

15. A receiving processing timing synchronization method used in an IP (Internet Protocol) stream transmitting/receiving system comprising an IP stream receiving device for performing at least an FEC (Forward Error Correction) decoding of a received IP stream at a receiving processing timing of the received IP stream, wherein the method comprising:

at the IP stream receiving device, generating the receiving processing timing based on TS (Transport Stream) synchronization that is established in TS time stamp reproducing processing by extracting time information from TS packets which have been FEC-decoded in the FEC decoding processing.

16. The receiving processing timing synchronization method according to claim 15, wherein the TS packets are output at time intervals based on time information added to each TS packet in the TS time stamp reproducing processing, and block synchronization is generated on the basis of the TS synchronization that is established based on the time information in the TS time stamp reproducing processing to provide the FEC decoding processing with the block synchronization.

17. The receiving processing timing synchronization method according to claim 15, wherein the receiving processing timing is generated by using at least any of a TS time stamp added to the TS packet, a top of a sequence number of an RTP (Real-time Transport Protocol) header of the received IP stream, and a synchronizing flag of a unique header of the received IP stream.

18. The receiving processing timing synchronization method according to claim 15, comprising:

measuring a receiving processing timing of a predetermined number of dummy TS packets at the IP stream receiving device; and generating a temporary synchronizing timing based on the measurement at the IP stream receiving device to provide the FEC decoding processing with the temporary synchronizing timing; wherein the FEC decoding processing is performed at the temporary synchronizing timing until the TS synchronization is established.

19. The receiving processing timing synchronization method according to claim 15, wherein the received IP stream is a UDP (User Datagram Protocol) packet of at least a video and audio stream.

20. The receiving processing timing synchronization method according to claim 19, wherein the video and audio stream is coded data and uncompressed data including an MPEG2 (Moving Picture Experts Group-2)-TS (Transport Stream).

21. The receiving processing timing synchronization method according to claim 15, wherein FEC input processing, FEC correction processing, and FEC output processing are sequentially performed in the FEC decoding processing; and the TS synchronization is established in the TS time stamp reproducing processing, after the FEC output processing is performed.

* * * * *